(12) United States Patent
Tomada et al.

(10) Patent No.: US 9,680,266 B2
(45) Date of Patent: Jun. 13, 2017

(54) HIGH DENSITY CONNECTOR

(71) Applicant: Cisco Technology, Inc., San Jose, CA (US)

(72) Inventors: Franco Tomada, San Jose, CA (US); Luca Cafiero, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/828,543

(22) Filed: Aug. 18, 2015

(65) Prior Publication Data

US 2017/0054259 A1 Feb. 23, 2017

(51) Int. Cl.
| | | |
|---|---|---|
| H01R 24/66 | (2011.01) | |
| H04Q 1/02 | (2006.01) | |
| H01R 43/26 | (2006.01) | |
| H01R 107/00 | (2006.01) | |

(52) U.S. Cl.
CPC ............. *H01R 24/66* (2013.01); *H01R 43/26* (2013.01); *H04Q 1/02* (2013.01); *H01R 2107/00* (2013.01); *H04Q 2201/802* (2013.01)

(58) Field of Classification Search
USPC ...... 439/660, 65, 66, 76.1, 620.23; 385/147, 385/92
See application file for complete search history.

(56) References Cited

U.S. PATENT DOCUMENTS

| | | | | |
|---|---|---|---|---|
| 6,304,436 B1 * | 10/2001 | Branch | ................ | G02B 6/4277 361/679.02 |
| 6,805,573 B2 * | 10/2004 | Phillips | ............ | H01R 13/62933 439/157 |
| 6,872,094 B1 * | 3/2005 | Murr | ..................... | G02B 6/4201 439/607.2 |
| 7,387,538 B2 * | 6/2008 | Engel | ................. | H01R 13/6658 439/620.23 |
| 7,883,341 B2 * | 2/2011 | Lang | ................... | H01R 13/6593 439/465 |
| 8,083,417 B2 * | 12/2011 | Aronson | ............. | G02B 6/3817 385/14 |
| 8,267,718 B2 * | 9/2012 | Straka | .................... | H01R 9/034 439/497 |
| 8,499,103 B2 * | 7/2013 | Carter | .................... | H04L 29/04 710/1 |

(Continued)

OTHER PUBLICATIONS

Tyco Electronics; Quad Small Form-Factor Pluggable (QSFP) Interconnect System (Mar. 16, 2012) Can be seen at: http://www.slideshare.net/element14/quad-small-formfactor-pluggable-qsfp-interconnect-system.

(Continued)

*Primary Examiner* — Alexander Gilman
(74) *Attorney, Agent, or Firm* — Samuel M. Katz

(57) ABSTRACT

In one embodiment, a method for increasing potential data capacity for a high-density transceiver connector includes: aligning at least two transceiver-switch copper contacts opposite at least one network switch copper contact associated with a network switch, aligning at least two transceiver-cable copper contacts opposite at least one cable copper contact, and connecting the at least two transceiver-switch copper contacts to the at least two transceiver-cable copper contacts, wherein the high-density transceiver connector shares a form factor with a low-density transceiver connector.

9 Claims, 4 Drawing Sheets

(56) References Cited

U.S. PATENT DOCUMENTS

| | | | | |
|---|---|---|---|---|
| 8,631,432 | B2* | 1/2014 | Roberts | H04N 7/17318 |
| | | | | 725/37 |
| 8,727,793 | B2* | 5/2014 | Cafiero | G02B 6/4201 |
| | | | | 439/540.1 |
| 8,767,806 | B2* | 7/2014 | Tang | H04L 25/03878 |
| | | | | 375/219 |
| 8,831,432 | B2 | 9/2014 | Tang et al. | |
| 8,926,339 | B2* | 1/2015 | Houtz | H01R 13/5045 |
| | | | | 439/76.1 |
| 2007/0232091 | A1* | 10/2007 | Hong | H05K 1/117 |
| | | | | 439/66 |
| 2007/0237489 | A1* | 10/2007 | Sasser | G02B 6/4246 |
| | | | | 385/147 |
| 2014/0314425 | A1* | 10/2014 | Cafiero | H04J 14/0265 |
| | | | | 398/141 |

OTHER PUBLICATIONS

QSFP/QSFP+ (Quad Small Form Factor Pluggable) Overview (2015) Can be seen at: http://www.te.com/catalog/minf/en/542.
Mazzini, Marco; CPAK to QSFP28 Converter for Extended Performance; IP.com Disclosure No. IPCOM000225743D (Mar. 1, 2013) Can be seen at: https://priorart.ip.com/IPCOM/000225743.

* cited by examiner

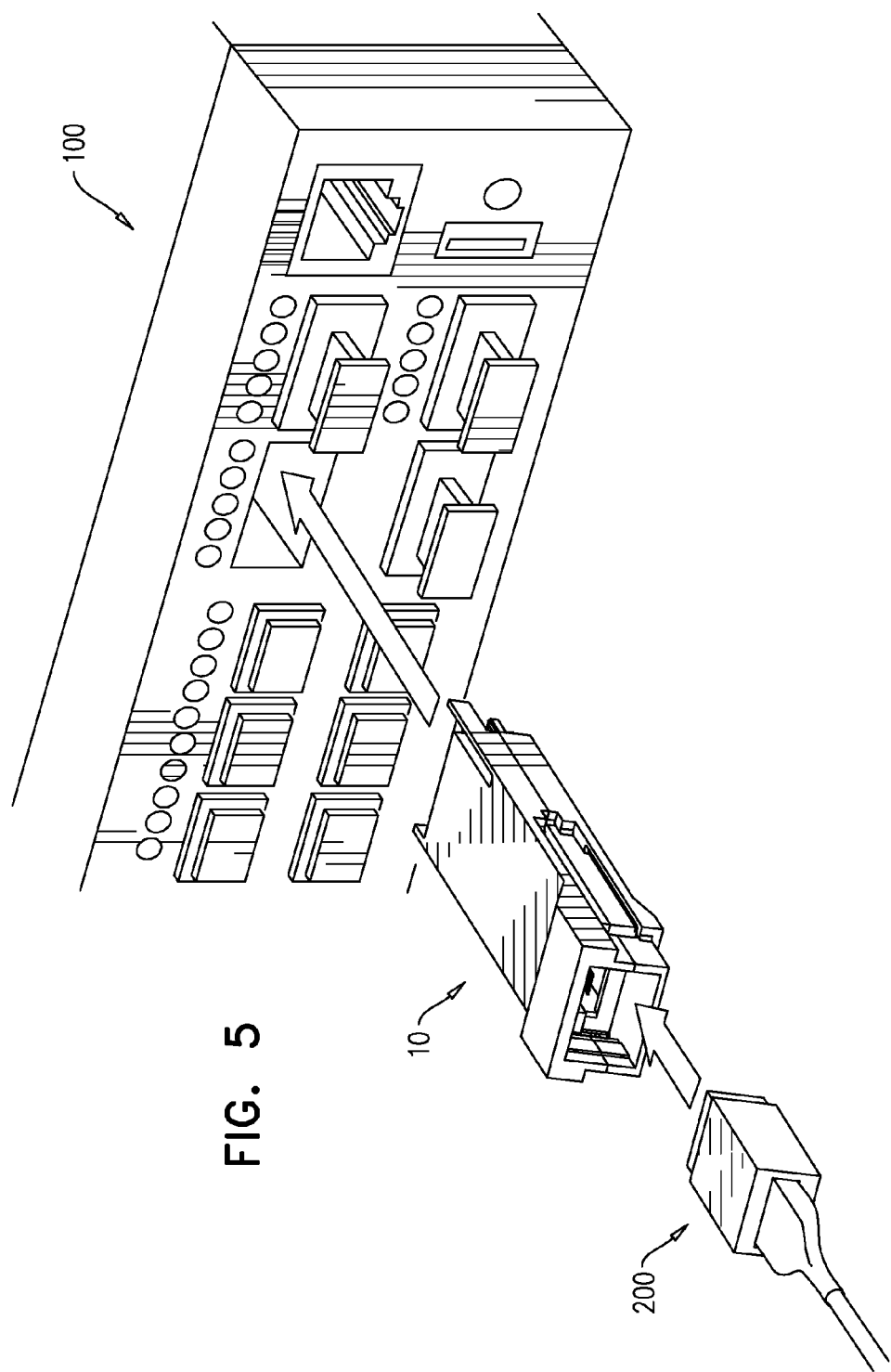

HIGH DENSITY CONNECTOR

FIELD OF THE INVENTION

The present invention generally relates to connectors for routing switches.

BACKGROUND OF THE INVENTION

Quad Small Form-factor Pluggable (QSFP) and Small Form-factor Pluggable (SFP) transceiver connectors provide connectivity between network switches and cables. Current connectors use rows of copper contacts aligned on either side of the male connector, corresponding to copper contacts similarly aligned in the female connection in a networking switch.

BRIEF DESCRIPTION OF THE DRAWINGS

The present invention will be understood and appreciated more fully from the following detailed description, taken in conjunction with the drawings in which:

FIG. 5 is a pictorial illustration of the high density transceiver connector of FIG. 1 arrayed for insertion into a network switch.

DESCRIPTION OF EXAMPLE EMBODIMENTS

Overview

A method for increasing potential data, capacity for a high-density transceiver connector includes: aligning at least two transceiver-switch copper contacts opposite at least one network switch copper contact associated with a network switch, aligning at least two transceiver-cable copper contacts opposite at least one cable copper contact, and connecting the at least two transceiver-switch copper contacts to the at least two transceiver-cable copper contacts, wherein the high-density transceiver connector shares a form factor with a low-density transceiver connector.

A high-density transceiver connector includes: at least two transceiver-switch copper contacts aligned to come in contact with at least one network switch copper contact; at least two transceiver-cable copper contacts aligned to come in contact at least one cable copper contact; and conductive elements, where the conductive elements connect the at least two transceiver-switch copper contacts to the at least two transceiver-cable copper contacts, and where the high-density transceiver connector shares a form factor with a low-density transceiver connector.

A method for maintaining backward/forward compatibility on small form factor pluggable transceiver connectors includes: aligning at least two transceiver-switch copper contacts opposite at least one network switch copper contact associated with a network switch, where data throughput for the small form factor pluggable transceiver connector is a function of connections between said at least two transceiver-switch copper contacts opposite at least one network switch copper contact, and the function is limited by a lowest number of copper contacts in both the at least two transceiver-switch copper contacts and the at least one network switch copper contact.

Detailed Description of Example Embodiments

It will be appreciated by one of ordinary skill in the art that each copper contact in a transceiver connector may be capable of a maximum data throughput. Accordingly, the total amount, of data that may be throughput into/from a network switch may effectively be limited by the number of copper contacts arranged in the transceiver connector used to connect a data, cable to a network switch.

Figure 1:
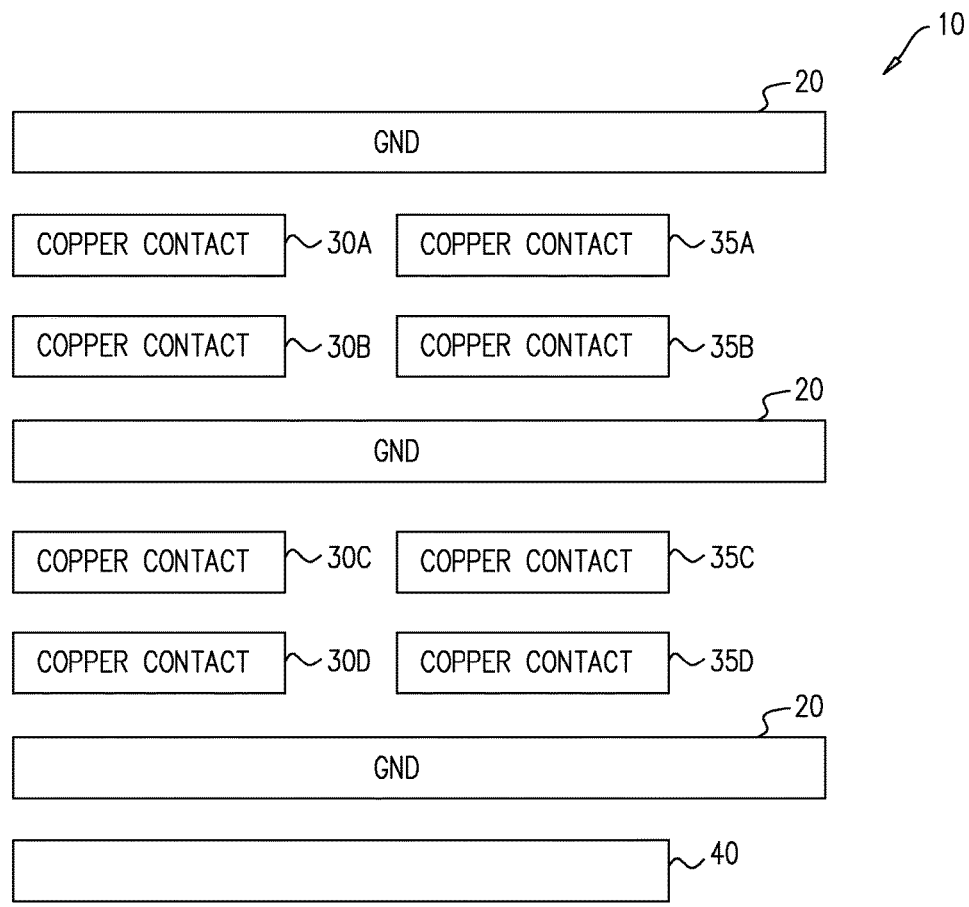
FIG. 1 is a simplified schematic illustration of an exemplary partial high density transceiver connector layout, constructed and operative in accordance with embodiments disclosed herein.
Figure 2:
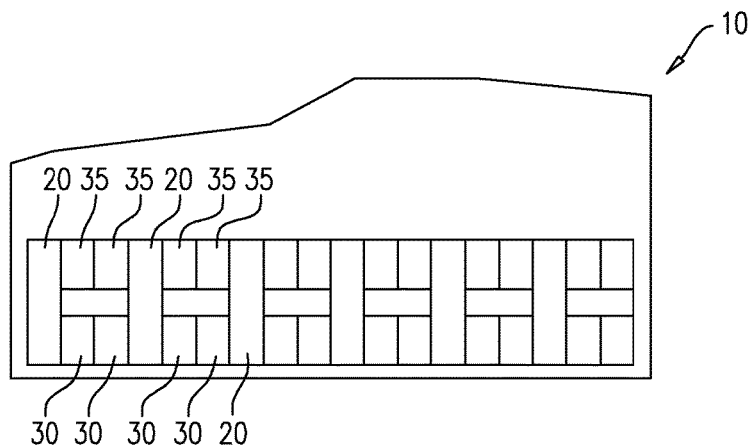
FIG. 2 is a pictorial illustration of the exemplary high density transceiver connector of FIG. 1.

In accordance with embodiments described herein, a transceiver connector may be configured with additional copper contacts in order to increase its maximum data throughput. Reference is now made to FIG. 1 which illustrates an exemplary partial layout of a high density transceiver connector 10. Transceiver connector 10 comprises grounds 20, half-length copper contacts 30 and 35, and full-length copper contact 40. It will be appreciated by one of ordinary skill in the art that FIG. 1 may represent a partial view of the layout of high density transceiver connector 10; in practice high density transceiver connector 10 may comprise additional grounds, 20, half-length copper contacts 30 and 35 and/or full-length copper contacts 40. FIG. 2, to which reference is now briefly made, illustrates a partial view of the high density transceiver connector 30 of FIG. 1.

Returning to FIG. 1, full-length copper contact 40 may represent a copper contact such as is currently known in the art. Half-length copper contacts 30 A-D are positioned generally in line with half-length copper contacts 35 A-D such that each pair of half-length copper contacts 30 and 35 may together have generally the same form factor as full-length copper contact 40; i.e., including an intervening space, together they are of generally the same length and width as full-length copper contacts 40. For example, half-length copper contacts 30A and 35A may together have generally the same footprint as full-length copper contact 40. Similarly, each pair of half-length copper contacts 30B and 35B, 30C and 35C, and 301) and 35D may have generally the same footprint as one full-length copper contact 40.

Figure 3:
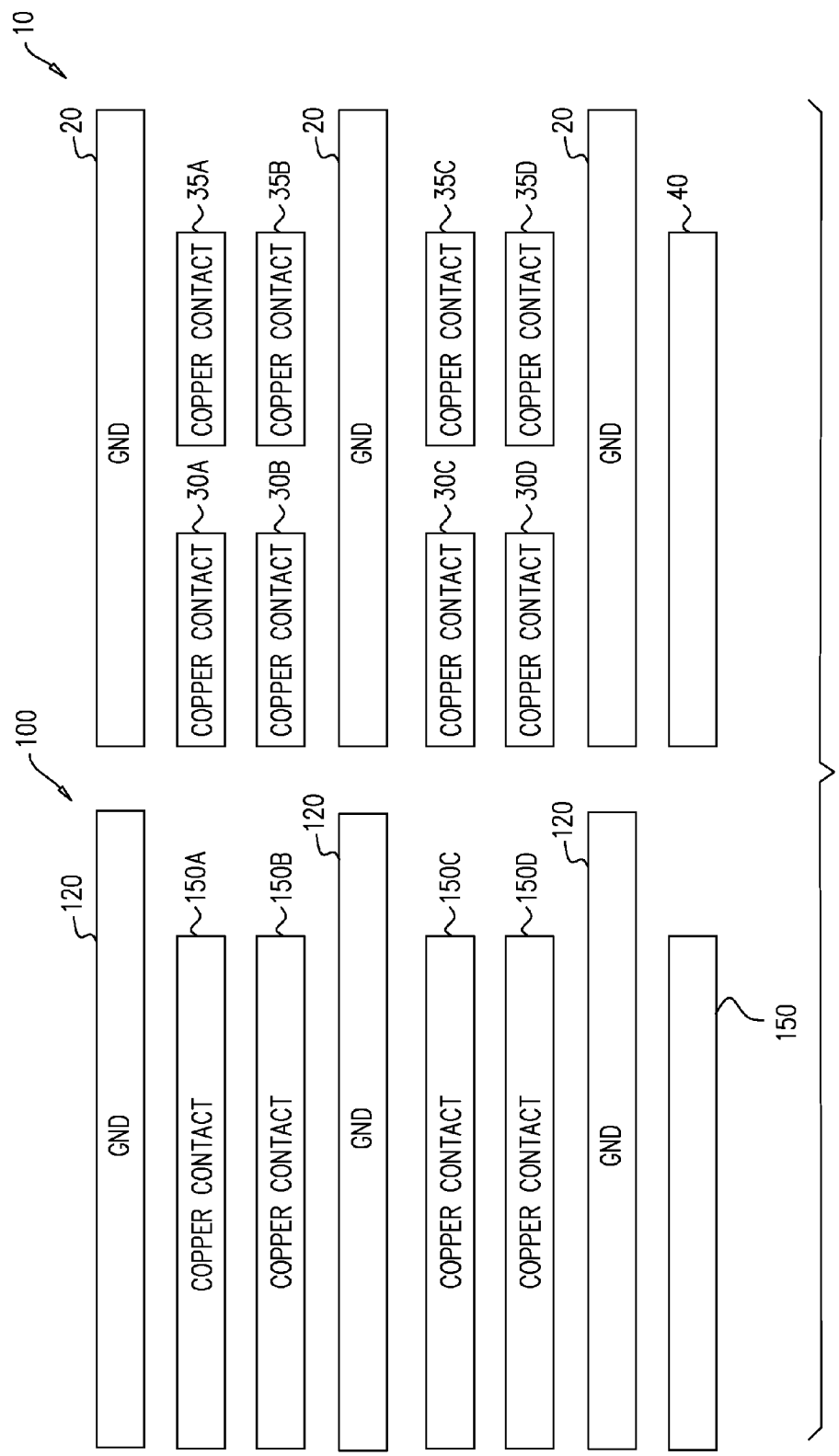
FIGS. 3 and 4 are simplified schematic illustrations of the exemplary partial high density transceiver connector layout of FIG. 1 in juxtaposition to exemplary partial network switch layouts.

Reference is now made to FIG. 3 which illustrates exemplary partial transceiver connector layout 10 of FIG. 3 in juxtaposition to an exemplary partial network switch layout 300. Network switch layout 100 comprises grounds 320 and copper contacts 150. It will be appreciated by one of ordinary skill in the art that network switch layout 100 is designed such that copper contacts 150 have the same form factor as copper contacts 40; when used in operation with existing transceiver connectors, each copper contact 150 may be positioned to come in contact with a full-length copper contact 40 and thereby to facilitate the transfer of data between the network switch and a device connected to the transceiver connector.

As depicted in FIG. 3, half-length copper contacts 30/35 are arrayed in position to come in contact with similarly arrayed copper contacts 150 to provide data throughput to network switch 100. For example, half-length copper contacts 30/35A are in position to come in contact with copper contact 150A; copper contacts 30/35B are in position to come in contact with copper contact 150B; copper contacts 30/35C are in position to come in contact with copper contact 150C; and copper contacts 30/35D are in position to come in contact with copper contact 150D.

It will be appreciated by one of ordinary skill in the art that as positioned, copper contacts 150 may be "length agnostic" with regard to whether or not they are in contact with half-length copper contacts 30/35 or full-length copper contacts 40. The maximum data throughput via a given copper contacts 150 may be generally constant, regardless of whether or not it is contact with a pair of half-length copper contacts 30 and 35, or a full-length copper contact 40.

It will be appreciated by one of ordinary skill in the art, that it may be problematic if a given copper contact 150 comes in contact with, and closes a circuit with both a half-length copper contact 30 and a half-length copper contact 35. In such a case, data from network switch 100 may be duplicated and/or corrupted by interference. Therefore, in accordance with embodiments described herein, half-length copper contacts 35 may be recessed relative to half-length copper contacts 30 to prevent contact with copper contacts 150. Non-conductive caps may also be affixed to the recessed half-length copper contacts 35 to further prevent crosstalk between copper contacts 150 and half-length copper contacts 35.

Alternatively, network switch 100 may be configured to sense the presence of half-length copper contacts 35 and programmatically open/close their associated circuitry in accordance with a configuration for network switch 100. In such a case, the housing for transceiver connector 10 may be configured to prevent its insertion into an inappropriately configured network switch 100. For example, the housing may be configured with a protruding piece of plastic or metal that does not fit into the female connector for network switch 100.

It will be appreciated by one of ordinary skill in the art that per the embodiment of FIG. 3, regardless of the disposition of half-length copper contacts 30/35 vis-à-vis full-length copper contacts 40 in transceiver connector 10, the maximum data throughput for network switch 100 is in practice limited by the number of copper contacts 150. Even though transceiver connector 10 may be capable of greater date throughput, the layout of network switch 100 may effectively negate any benefit (in terms of extra data throughput) provided by the greater number of copper contacts in transceiver connector 10.

Figure 4:
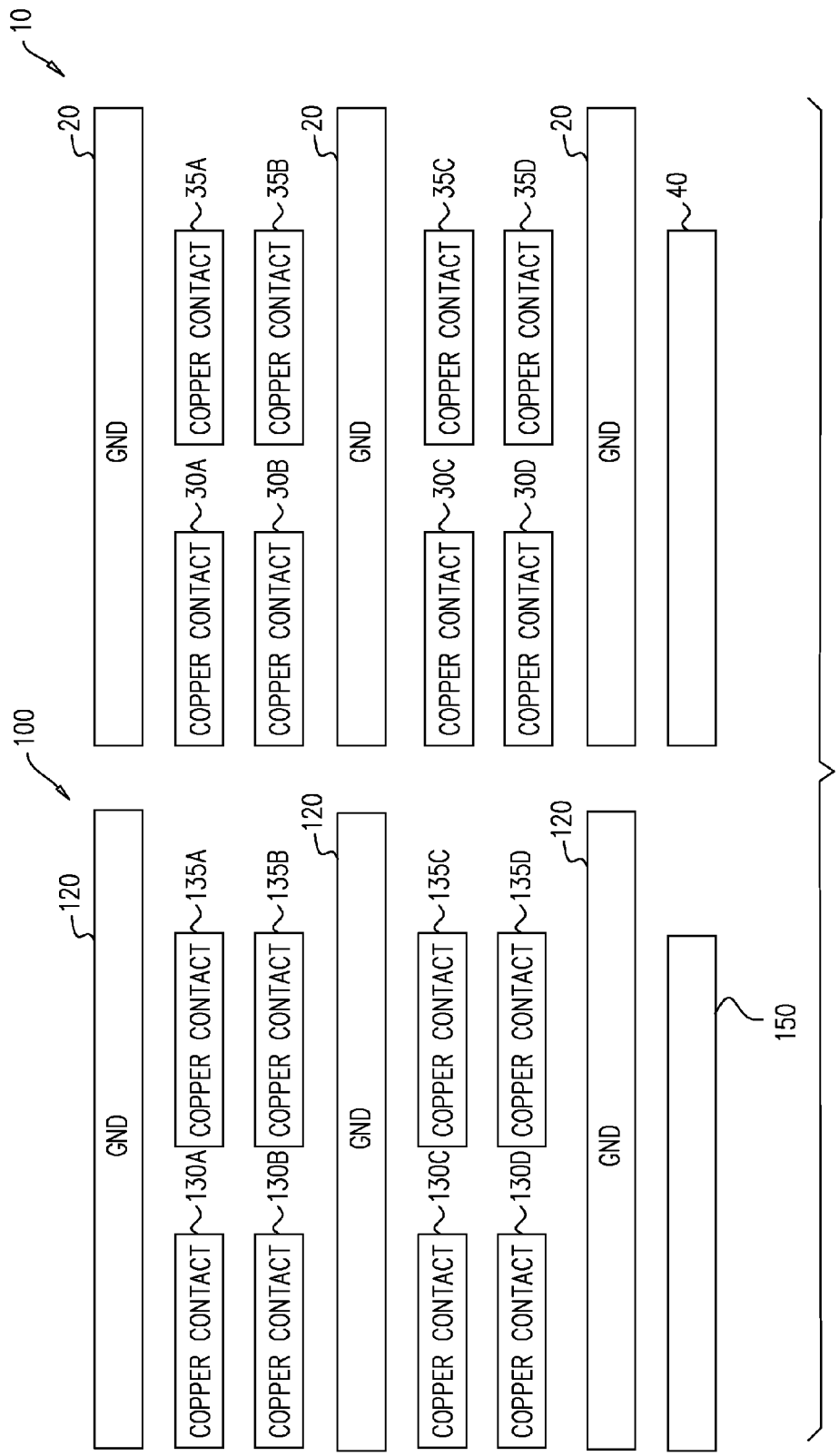

However, in accordance with some embodiments described herein, the number of copper contacts arranged in network switch 100 may be similarly increased in order to increase the data, throughput of network switch 100. Reference is now made to FIG. 4 which illustrates exemplary partial transceiver connector layout 10 of FIG. 1 in juxtaposition to an alternative partial network switch layout 100. In the embodiment of FIG. 4, the arrangement of copper contacts in transceiver connector 10 is generally similar in terms of number and positioning to a corresponding arrangement of copper contacts for network switch 100. Half-length copper contacts 30/35 correspond with copper contacts 130/135, and copper contact 40 corresponds with copper contact 150. Accordingly, it will be appreciated by a person of ordinary skill in the art that the maximum data, throughput for the network switch 100 of FIG. 4 may be greater than that of the network switch 100 of FIG. 3, at least with regard to the number of connected copper contacts.

It will also be appreciated by a person of ordinary skill in the art that the layouts of FIGS. 3 and 4 are exemplary; in accordance with embodiments described herein, transceiver connector 10 may be configured with any suitable combination of half-length copper contacts 30/35 vis-à-vis full-length copper contacts 40 as long as it doesn't necessitate modification of the form factor for transceiver connector 10. Similarly, network switch 100 may be configured with any suitable combination of half-length copper contacts 130/135 vis-à-vis copper contacts 150 as long as it doesn't necessitate modification of the form factor for transceiver connector 10. Accordingly, maximum data throughput through transceiver connector 10 through to network switch 100 may effectively be doubled if all full-length copper contacts 40 are replaced by pairs of half-length copper contacts 30/35, and all corresponding copper contacts 150 are replaced by pairs of half-length copper contacts 130/135.

Furthermore, in accordance with embodiments described herein, each full-length copper contact 40 may alternatively be replaced by three third-length copper contacts in generally the same manner, as long as the three third-length copper contacts occupy generally the same footprint as full-length copper contact 40. Assuming a corresponding replacement of copper contact 150 in network switch 100, maximum throughput may then be increased threefold. It will be appreciated by one of ordinary skill in the art that full-length copper contact 40 may be replaced by even more, smaller copper contacts, as long as the original form factor for transceiver connector 10 is maintained.

Reference is now made to FIG. 5 which is a pictorial illustration of a transceiver connector 10 arrayed for insertion ii to network switch 100. As depicted cable 200 slots into transceiver connector 10 to provide connectivity between a networked device and network switch 100. It will be appreciated that in much the same way as transceiver connector 10 transmits/receives data through copper contacts in contact with copper contacts on network switch 100, a similar corresponding relationship for the transfer of data exists between a layout of copper contacts on transceiver connector 10 and a layout of copper contacts on cable 200. It will similarly be appreciated that the maximum data throughput between transceiver connector 10 and network switch 100 may also be limited by the layout of copper contacts on cable 200. It will also be appreciated, that transceiver connector 10 comprises internal conductive elements such as wiring or printed circuitry to facilitate the transfer of data from each half-length copper contact 30/35 and full-length copper contact 40 aligned opposite network switch to a corresponding copper contact of the same form factor aligned opposite cable 200.

It will be appreciated by one of ordinary skill in the art that a high density transceiver connector such as transceiver connector 10 may effectively double the capacity of the possible connection, while maintaining the same form factor and thereby allowing for backwards compatibility. This may provide space savings and reduced real estate, power and/or cabling costs as compared to that achievable with currently available transceiver connectors.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for increasing potential data capacity for a high-density transceiver connector, the method comprising:
   aligning at least two transceiver-switch copper contacts opposite one network switch copper contact associated with a network switch;
   aligning at least two transceiver-cable copper contacts opposite one cable copper contact; and
   connecting said at least two transceiver-switch copper contacts to said at least two transceiver-cable copper contacts, wherein said high-density transceiver connector shares a form factor with a low-density transceiver connector.

2. The method according to claim 1 and wherein said high density transceiver connector is a Quad Small Form-factor Pluggable (QSFP) transceiver connector.

3. The method according to claim 1 and wherein said high density transceiver connector is a Small Form-factor Pluggable (SFP) transceiver connector.

4. The method according to claim 1 and wherein:
   said aligning at least two transceiver-switch copper contacts comprises aligning said at least two transceiver-switch copper contacts in parallel rows; and
   said aligning at least two transceiver-cable copper contacts comprises aligning said at least two transceiver-cable copper contacts in parallel rows.

5. The method according to claim 1 and wherein:
   said connecting comprises programmatic control of circuitry associated with said one network switch copper contact.

6. A method for maintaining backward/forward compatibility on small form factor pluggable transceiver connectors, the method comprising:
   aligning at least two transceiver-switch copper contacts opposite one network switch copper contact associated with a network switch, wherein:
      an initial maximum data throughput for said small form factor pluggable transceiver connector is a function of connections between said at least two transceiver-switch copper contacts opposite one network switch copper contact, and
      said function is limited by a lowest number of copper contacts in both said at least two transceiver-switch copper contacts and said at least one network switch copper contact.

7. The method according to claim 6 and further comprising:
   realigning said at least two transceiver-switch copper contacts opposite at least two network switch copper contact associated with a second network switch,
   wherein a new maximum data throughput is limited by a data capacity for said at least two network switch copper contacts.

8. The method according to claim 6 and wherein said small form factor pluggable transceiver connectors are Quad Small Form-factor Pluggable (QSFP) transceiver connectors.

9. The method according to claim 6 and wherein:
   said aligning at least two transceiver-switch copper contacts comprises aligning said at least two transceiver-switch copper contacts in parallel rows.

* * * * *

UNITED STATES PATENT AND TRADEMARK OFFICE
CERTIFICATE OF CORRECTION

| | |
|---|---|
| PATENT NO. | : 9,680,266 B2 |
| APPLICATION NO. | : 14/828543 |
| DATED | : June 13, 2017 |
| INVENTOR(S) | : Franco Tomada et al. |

It is certified that error appears in the above-identified patent and that said Letters Patent is hereby corrected as shown below:

In the Specification

Column 1, Line 41, "data, capacity" to read as --data capacity--.

Column 2, Line 12, "amount, of" to read as --amount of--.

Column 2, Line 15 approx., "data, cable" to read as --data cable--.

Column 2, Line 31, "connector 30" to read as --connector 10--.

Column 2, Line 44, "301)" to read as --30D--.

Column 2, Line 50, "300. Network" to read as --100. Network--.

Column 2, Line 50, "grounds 320" to read as --grounds 120--.

Column 3, Line 48, "data, throughput" to read as --data throughput--.

Column 3, Lines 59-60, "data, throughput" to read as --data throughput--.

Column 4, Line 27, "ii to network" to read as --into network--.

Column 4, Line 27, "depicted cable" to read as --depicted, cable--.

Column 4, Line 39, "appreciated, that" to read as --appreciated that--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,680,266 B2

In the Claims

Column 6, Line 23 approx., Claim 7, "contact" to read as --contacts--.